United States Patent

Kaneko et al.

[11] Patent Number: 5,995,765
[45] Date of Patent: Nov. 30, 1999

[54] CAMERA WITH DISTANCE-MEASURING SENSOR UNIT FOR USE IN PHOTOGRAMMETRIC ANALYTICAL MEASUREMENT

[75] Inventors: Atsumi Kaneko, Tokyo; Toshihiro Nakayama; Atsushi Kida, both of Saitama, all of Japan

[73] Assignee: Asahi Kogaku Kogyo Kabushiki Kaisha, Tokyo, Japan

[21] Appl. No.: 09/003,510

[22] Filed: Jan. 6, 1998

[30] Foreign Application Priority Data

Jan. 7, 1997 [JP] Japan ................................. 9-011984
Sep. 11, 1997 [JP] Japan ................................. 9-264990

[51] Int. Cl.⁶ .................................................. G03B 3/00
[52] U.S. Cl. ................................ 396/89; 396/7; 396/50; 348/144
[58] Field of Search ........................... 396/7, 50, 89; 348/144

[56] References Cited

U.S. PATENT DOCUMENTS 5,335,072  8/1994  Tanaka et al. .
5,555,018  9/1996  von Braun ................................. 348/144
5,596,494  1/1997  Kuo .......................................... 348/144

FOREIGN PATENT DOCUMENTS 5336419  12/1993  Japan .
6-67293   3/1994   Japan .
8285585  11/1996  Japan .

*Primary Examiner*—Russell Adams
*Attorney, Agent, or Firm*—Greenblum & Bernstein, P.L.C.

[57] ABSTRACT

A camera is used in a photogrammetric analytical measurement, and has a distance-measuring sensor unit for measuring a vertical distance between the camera and a sloping surface of the ground and a minimum distance between the camera and the sloping surface of the ground when the camera is placed above the sloping surface of the ground. The camera has a memory medium for storing the vertical distance and the minimum distance as vertical distance data and minimum distance data, respectively.

24 Claims, 16 Drawing Sheets

CAMERA WITH DISTANCE-MEASURING SENSOR UNIT FOR USE IN PHOTOGRAMMETRIC ANALYTICAL MEASUREMENT

BACKGROUND OF THE INVENTION

1. Field of the Invention

This invention relates to a camera, with a distance-measuring sensor unit, for use in a photogrammetric analytical measurement.

2. Description of the Related Art

For example, photogrammetry is carried out at a traffic accident spot. The traffic accident spot is photographed by a camera in at least two different locations, and a set of photographed pictures is selected to establish a survey map of the traffic accident spot.

In particular, a two-dimensional coordinate system is defined on each of the photographed pictures, and two-dimensional positions of objects, which are recorded on each picture, are determined in accordance with the two-dimensional system. Then, a three-dimensional coordinate system is produced based on the two sets of two-dimensional coordinate systems, and three-dimensional positions of the recorded objects are determined in accordance with the three-dimensional coordinate system. Accordingly, it is possible to obtain a survey map of the traffic accident spot by drawing the objects on a sheet of paper such that the objects are projected on one of the three planes defined by the three-dimensional system.

Before accurately scaled distances and lengths can be reproduced on the survey map, a standard measurement scale must be recorded together with the objects in the photographed pictures. Also, a standard reference plane, on which the survey map should be based, must be defined in the photographed pictures.

Usually, in order to define the standard measurement scale and the reference plane, three respective cone-shaped markers, which are identical to each other, are positioned at suitable locations of a traffic accident spot. Namely, a distance between two apexes of the cone-shaped markers, measured, for example, with a measuring tape, is defined as being the standard measurement scale, and a plane, defined by the three apexes of the cone-shaped markers, is utilized as the reference plane.

If the ground is flat at the traffic accident spot, i.e. if the reference plane, defined by the apexes of the markers, coincides with a horizontal plane, it is possible to properly and precisely draw the survey map on the reference plane. However, if a surface of the ground is sloping, i.e. if the reference plane is inclined with respect to the horizontal plane, the survey map cannot be properly and precisely drawn.

Accordingly, when the ground surface is sloping, a slope angle must be measured and the determination of the three-dimensional positions of the objects should be carried out, taking the measured slope angle into consideration, before a proper and precise drawing of the survey map can be ensured. Nevertheless, it is troublesome to measure a slope angle of the ground surface, and the measurement of the slope angle may be mistakenly not taken into account.

On the other hand, there is also a demand for drawing a survey map on a vertical plane, perpendicular to the horizontal plane or the reference plane. Before this demand can be satisfied, a vertical distance between the camera and the ground surface should be measured. Similarly, it is troublesome to measure such a vertical distance between the camera and the ground surface, and the measurement of the vertical distance may also be mistakenly not taken account.

SUMMARY OF THE INVENTION

Therefore, an object of the present invention is to provide a camera with a distance-measuring sensor unit, which is constituted such that a measurement of a slope angle of a surface of the ground can be ensured by the distance-measuring sensor unit whenever a photographing operation is executed by the camera.

Another object of the present invention is to provide a camera with a distance-measuring sensor unit, which is constituted such that a vertical distance between the camera and a surface of the ground can be ensured by the distance-measuring sensor unit, whenever a photographing operation is executed by the camera.

In accordance with an aspect of the present invention, there is provided a camera for use in a photogrammetric analytical measurement, comprising a distance-measuring sensor unit for measuring a vertical distance between the camera and a sloping surface of a ground and a minimum distance between the camera and the sloping surface of the ground when placing the camera above the sloping surface of the ground.

Preferably, the camera further comprises a memory medium, such as an IC memory card, for storing the vertical distance and the minimum distance as vertical distance data and minimum distance data, respectively. The memory card may further store image data obtained by photographing.

The camera may also comprise a calculator for calculating a slope angle of the sloping surface of the ground on the basis of the vertical distance and the minimum distance. In this case, the memory medium stores the calculated slope angle as slope-angle data, in place of the vertical distance data and the minimum distance data. Preferably, the memory stores the vertical distance data whenever the sloping-angle data is stored.

Preferably, the distance-measuring sensor unit is freely rotatable around an axis perpendicular to an optical axis of a photographing optical system of the camera, and is constituted such that a measurement of the vertical distance is enabled at a balance position, whereby the distance-measuring sensor unit is balanced under the action of gravity. In this case, for the subsequent measurement of the minimum distance, the distance-measuring sensor unit is rotated from the balanced position to another position.

In accordance with another aspect of the present invention, there is provided a memory medium for storing image data, photographed by a camera placed above a sloping surface of the ground, and distance data, exhibiting a vertical distance between the camera and the sloping surface of the ground and a minimum distance between the camera and the sloping surface of the ground.

In accordance with yet another aspect of the present invention, there is provided a memory medium for storing image data, photographed by a camera placed above a sloping surface of the ground, and slope-angle data, exhibiting a slope angle of the sloping surface of the ground with respect to a horizontal plane. Preferably, the memory medium further stores distance data exhibiting a vertical distance between the camera and the sloping surface of the ground.

BRIEF DESCRIPTION OF THE DRAWINGS

The objects and other objects of the present invention will be better understood from the following description, with reference to the accompanying drawings in which.

DESCRIPTION OF THE PREFERRED EMBODIMENTS

Figure 1:
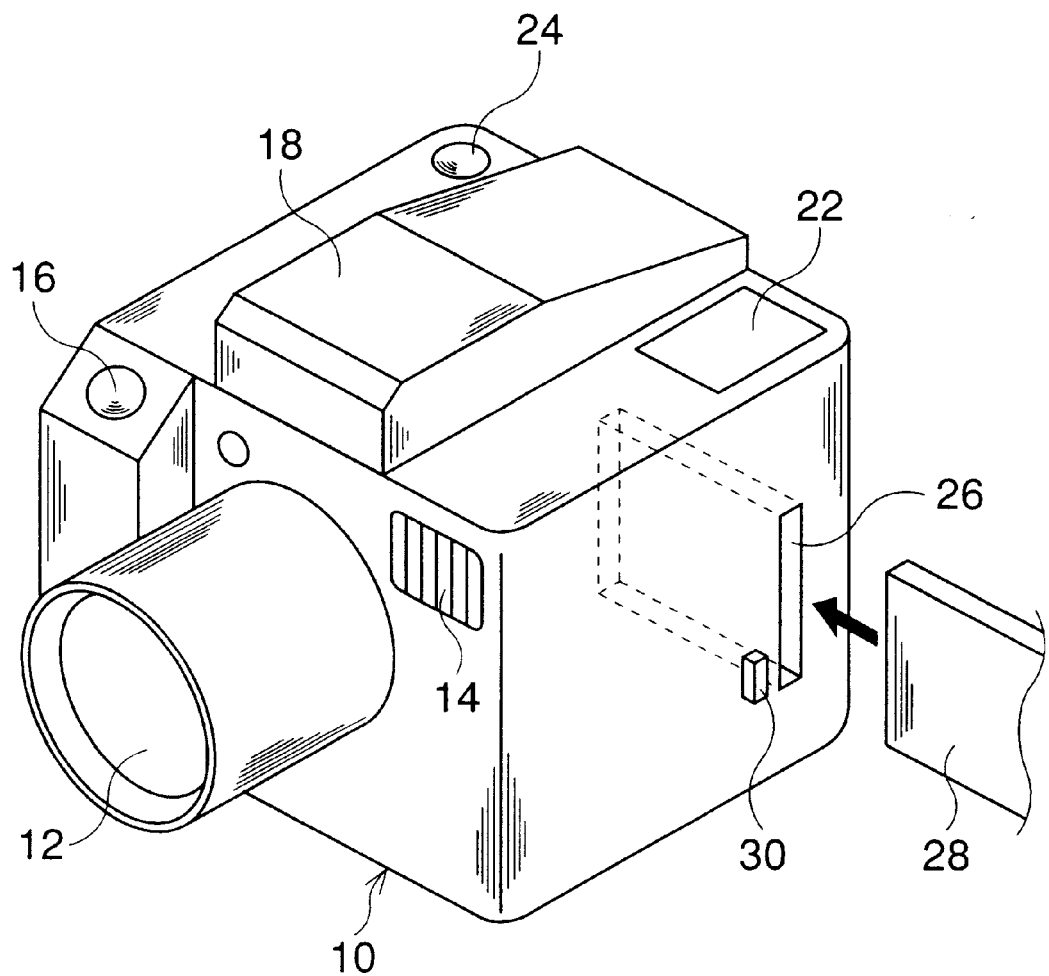
FIG. 1 is a schematic perspective view showing an appearance of an electronic still video camera, according to the present invention.

FIG. 1 is an external view of an electronic still video camera, according to the present invention, which comprises: a camera body 10; a photographing optical system 12 provided at an approximately central location on a front surface of the camera body 10; an electronic flash 14 disposed on the front surface of the camera body 10 above and to the right side of and above the photographing optical system 12; and a release switch button 16 provided on the front, on a side opposite to the electronic flash 14, relative to the photographing optical system 12.

Also, the camera is provided with a view finder 18, provided centrally on the top surface of the camera body 10, and an LCD (liquid crystal display) panel 22 provided on the top surface and to one side of the view finder 18, and a main switch button 24 provided on the other side of the view finder 18. Further, the camera body 10 has an elongated slot 26 formed in a side wall thereof, and a recording medium 28, such as an IC memory card, is loaded and unloaded in the camera through the elongated slot 26. Note, in FIG. 1, reference numeral 30 indicates a button for ejecting and unloading the IC memory card 28 from the camera through the elongated slot 26.

Note, although not visible in FIG. 1, an LCD-type monitor (indicated by reference 72 in FIG. 3) is incorporated in a rear wall of the camera body 10, such that a photographed image can be reproduced and observed on the monitor.

Figure 2:
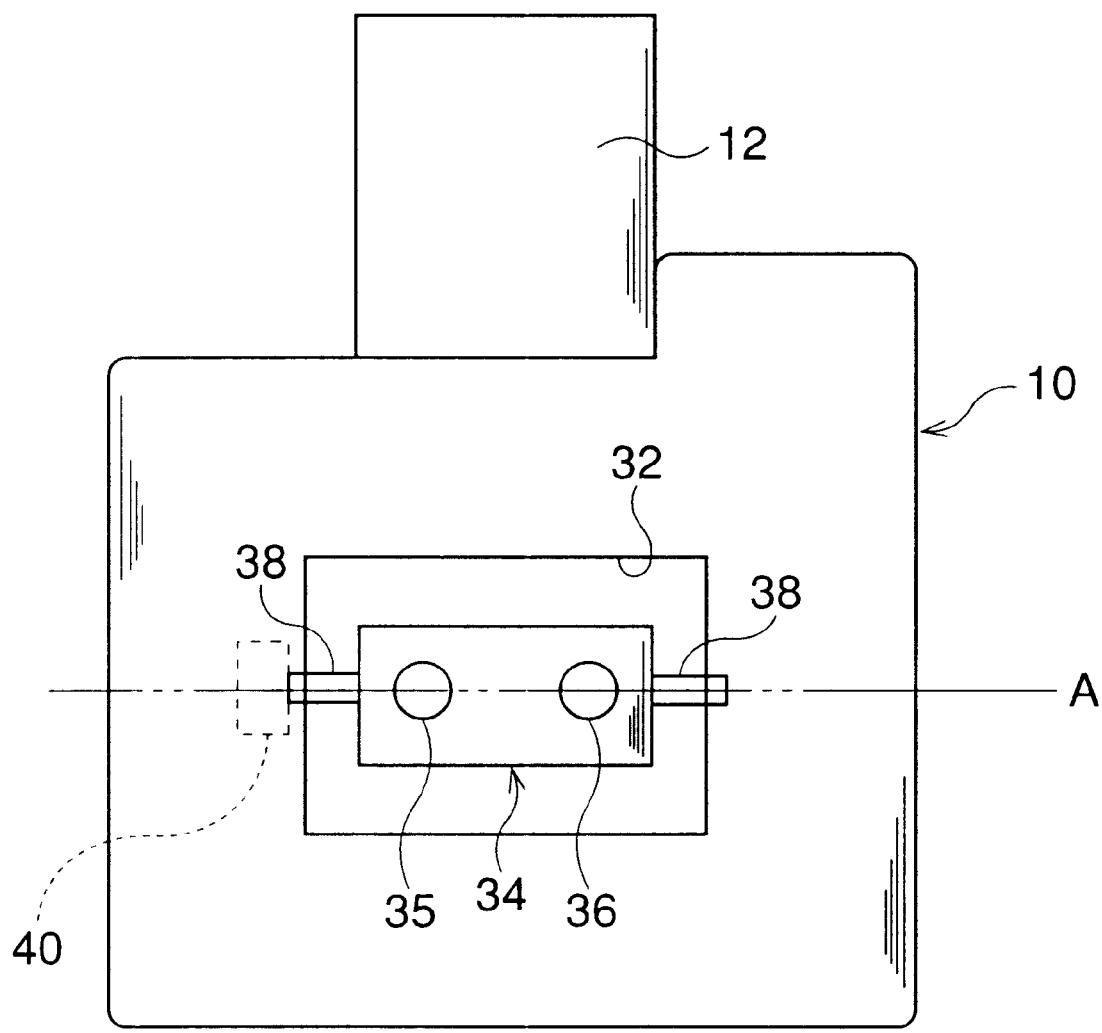
FIG. 2 is a bottom view of the electronic still video camera shown in FIG. 1.

As shown in FIG. 2, the camera is provided with a distance-measuring sensor unit 34 rotatably provided in a recess 32 formed in a bottom wall of the camera body 10, and the distance-measuring sensor unit 34 comprises a light-emitter 35 for emitting a light beam, such as an infrared light beam, toward an object, and a light-receiver for receiving an infrared light beam reflected from the object.

The light-receiver 36 may comprise a PSD (positive sensitive device). The light-emitter 35 and the light-receiver (PSD) 36 are spaced away from each other by a given distance. A position of incidence of the light beam on the light-receiver (PSD) 36 is detected, the position of incidence of the infrared light beam varying dependent upon an angle at which the infrared light beam is reflected from the object. Thus, it is possible to determine a distance between the light-emitter 35 and the object based on a detected position of incidence of the light beam, the determined distance being outputted, as a distance-data signal, from the light-receiver (PSD) 36.

As is apparent from FIG. 2, the distance-measuring sensor unit 34 has a pair of shaft elements 38 protruded from opposed side end faces thereof, and the shaft elements 38 are aligned with each other along a central longitudinal axis A of the distance-measuring sensor unit 34, which extends perpendicularly to an optical axis of the photographing optical system 12. The shaft elements 38 are rotatably supported by opposed side walls of the recess 32 through the intermediary of suitable bearings (not shown), and thus the distance-measuring sensor unit 34 is rotatable around the central longitudinal axis A. One of the shaft elements 38 is operatively connected to an electric motor 40 provided in the camera body 10.

While the electric motor 40 is not driven, the distance-measuring sensor unit 34 is freely rotatable around the central longitudinal axis A thereof, and an arrangement of the mass of the distance-measuring sensor unit 34 is balanced such that a light-beam-emitting axis of the light-emitter thereof is ordinally oriented vertically, under the action of gravity. Namely, regardless of a position of the camera when attached to a mount of a tripod, the distance-measuring sensor unit 34 remains at the balanced position, whereby an infrared light beam can be vertically emitted from the light-emitter 35 of the distance-measuring sensor unit 34, as long as the electric motor 40 is not being driven.

The electric motor 40 is driven in such a manner that the distance-measuring sensor unit 34 is rotated from the balanced position to a position at which the light-emitting axis of the light-emitter thereof is horizontally oriented, and a rotational direction of the distance-measuring sensor unit 34 depends upon a driving direction of the electric motor 40.

Namely, whenever the electric motor 40 is driven, the distance-measuring sensor unit 34 is rotated over the angular range of 90 degrees.

Figure 3:
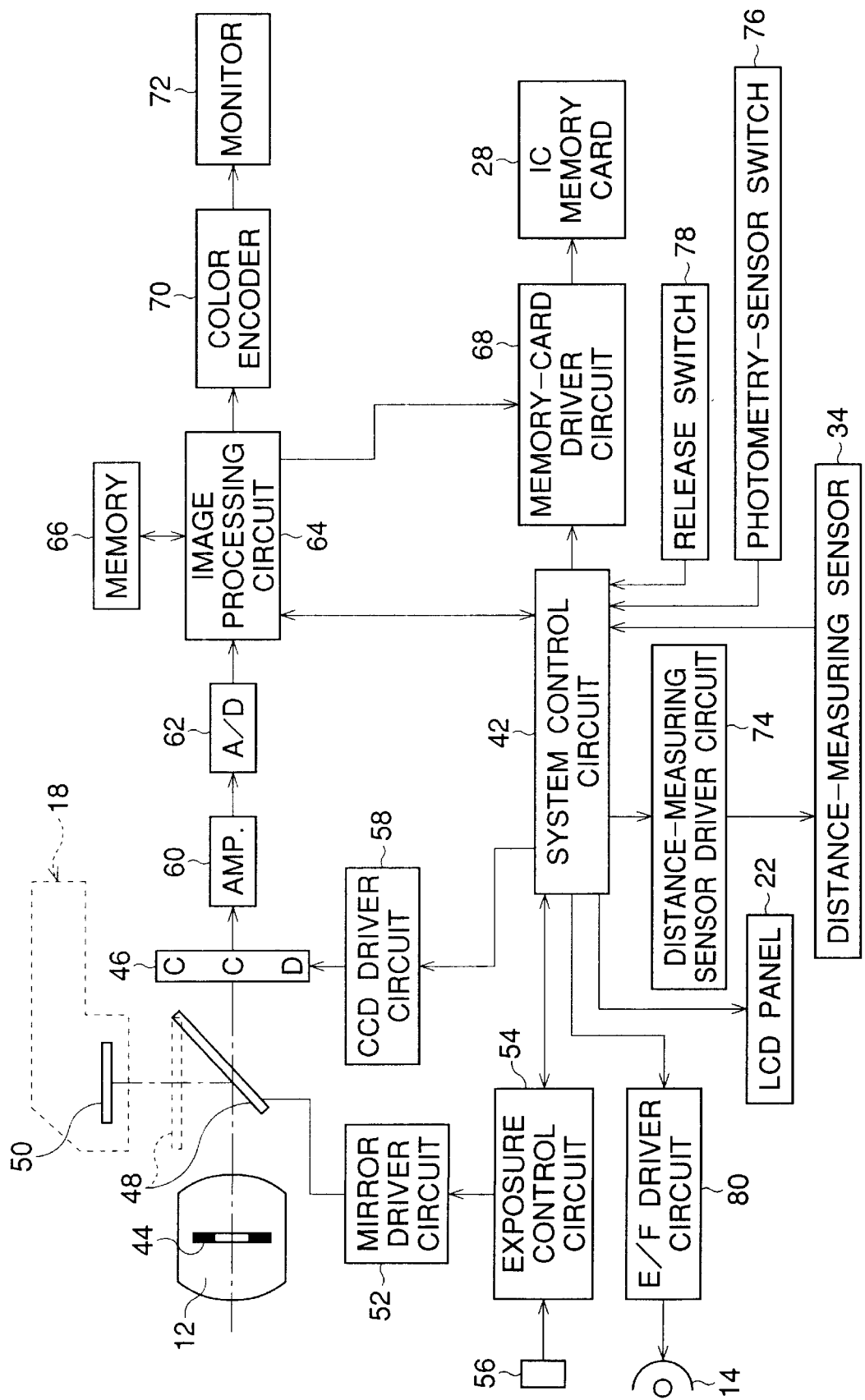
FIG. 3 is a block diagram of the electronic still video camera shown in FIG. 1.

FIG. 3 shows a block diagram of the camera according to the present invention. In this block diagram, reference 42 indicates a system control circuit, which includes a microcomputer or microprocessor, a read-only memory (ROM), and a random-access-memory (RAM), etc., to control the camera as a whole.

The photographing optical system 12 comprises a plurality of lens groups and an aperture or diaphragm 44 incorporated therein. A solid area image sensor 46 is disposed behind the photographing optical system 12, and serves as a photoelectric-conversion device. Preferably, the solid area image sensor 46 is constituted as a CCD (charge-coupled device) area image sensor. A quick return mirror 48 is placed between the photographing optical system 12 and the CCD image sensor 46, and a focusing glass 50, included in a view finder optical system of the view finder 18, is disposed above the quick return mirror 48.

The quick return mirror 48 is driven by a mirror driver circuit 52 so as to be moved between a down-position (i.e. the inclined position shown by the solid lines in FIG. 3) and an up-position (i.e. the horizontal position shown by the broken lines in FIG. 3). The mirror driver circuit 52 is controlled by an exposure control circuit 54, having a photometry sensor 56 connected thereto, the exposure control circuit 54 being operated under the control of the system control circuit 42 on the basis of an output signal of the photometry sensor 56.

The quick return mirror 48 is usually in the down-position or the inclined position, and thus light beams, passing through the photographing optical system 12, are directed to the optical system of the viewfinder 18, so that an object to be photographed can be observed through the viewfinder 18 by a photographer. When a photographing operation is executed, the quick return mirror 48 is rotated upward by the mirror drive circuit 52, and is then in the up-position, so that the light beams, passing through the photographing optical system 12, are directed to a light-receiving area of the CCD area image sensor 46. Namely, due to the photographing optical system 12, an optical image is formed on the light-receiving area of the CCD area image sensor 46.

Note, although not shown in FIG. 3, an iris driver circuit is provided to drive the diaphragm 44, and is also controlled by the exposure driver circuit 52.

The CCD area image sensor 46 has an electronic shutter function, and a time of exposure (i.e. a time of electric charge accumulation) is regulated by the electronic shutter function of the CCD area image sensor 46 on the basis of an output signal of the photometry sensor 56. After the time of exposure has elapsed, the quick return mirror 48 is returned from the up-position to the down-position. During the time of exposure, the CCD area image sensor 46 converts the optical image into electrical pixel signals. The converted electrical pixel signals are read out from the CCD area image sensor 46 by a CCD driver circuit 58 which is operated under control of the system control circuit 42.

The pixel signals read out of the CCD area image sensor 46 are amplified by an amplifier 60, and are then converted to digital pixel signals by an analog-to-digital (A/D) converter 62. The digital pixel signals are subjected to a shading correction, a gamma correction, and so on by an image processing circuit 64 under control of the system control circuit 42, and are then temporarily stored in a memory 66, having a capacity for storing a frame of digital pixel signals outputted from the CCD area image sensor 46.

The pixel signals outputted from the memory 66 are fed to a memory-card driver circuit 68 by which the fed pixel signals are stored as a frame of pixel data in the IC memory card 28. Also, the frame of pixel signals may be outputted from the memory 66 into a color encoder 70, which produces a color video signal on the basis of the frame of pixel signals, the color video signal then being fed to an LCD-type monitor 72, on which the photographed image is reproduced and observed. Note, as mentioned above, the LCD-type monitor 72 is provided in the rear wall of the camera body 10.

The distance-measuring sensor unit 34 is driven by a distance-measuring sensor driver circuit 74 operated under the system control circuit 42. Namely, the distance-measuring sensor unit 34 and the electric motor 40 therefor are driven by the distance-measuring sensor driver circuit 74 in the manner as mentioned previously. The system control circuit 42 retrieves a distance-data signal outputted from the light-emitter (PSD) 36 of the distance-measuring sensor unit 34.

As shown in FIG. 3, the camera is provided with a photometry-sensor switch 76 and a release switch 78, both being associated with the release switch button 16 (FIG. 1). In particular, when the release switch button 16 is half depressed, the photometry-sensor switch 76 is turned ON, and, when the release switch button 16 is fully depressed, the release switch 78 is turned ON. Further, the release switch button 16 is associated with the distance-measuring sensor unit 34, as explained in detail hereinafter.

Also, as shown in FIG. 3, the electronic flash 14 is electrically energized by an electronic flash driver circuit 80, operated under the control of the system control circuit 42. The electrical energization of the electronic flash 14 is carried out as soon as the release switch button 16 is fully depressed, if necessary. Also, the LCD panel 22 is connected to the system control circuit 42 to display various setting conditions of the camera, suitable massages, and so on.

Figure 4:
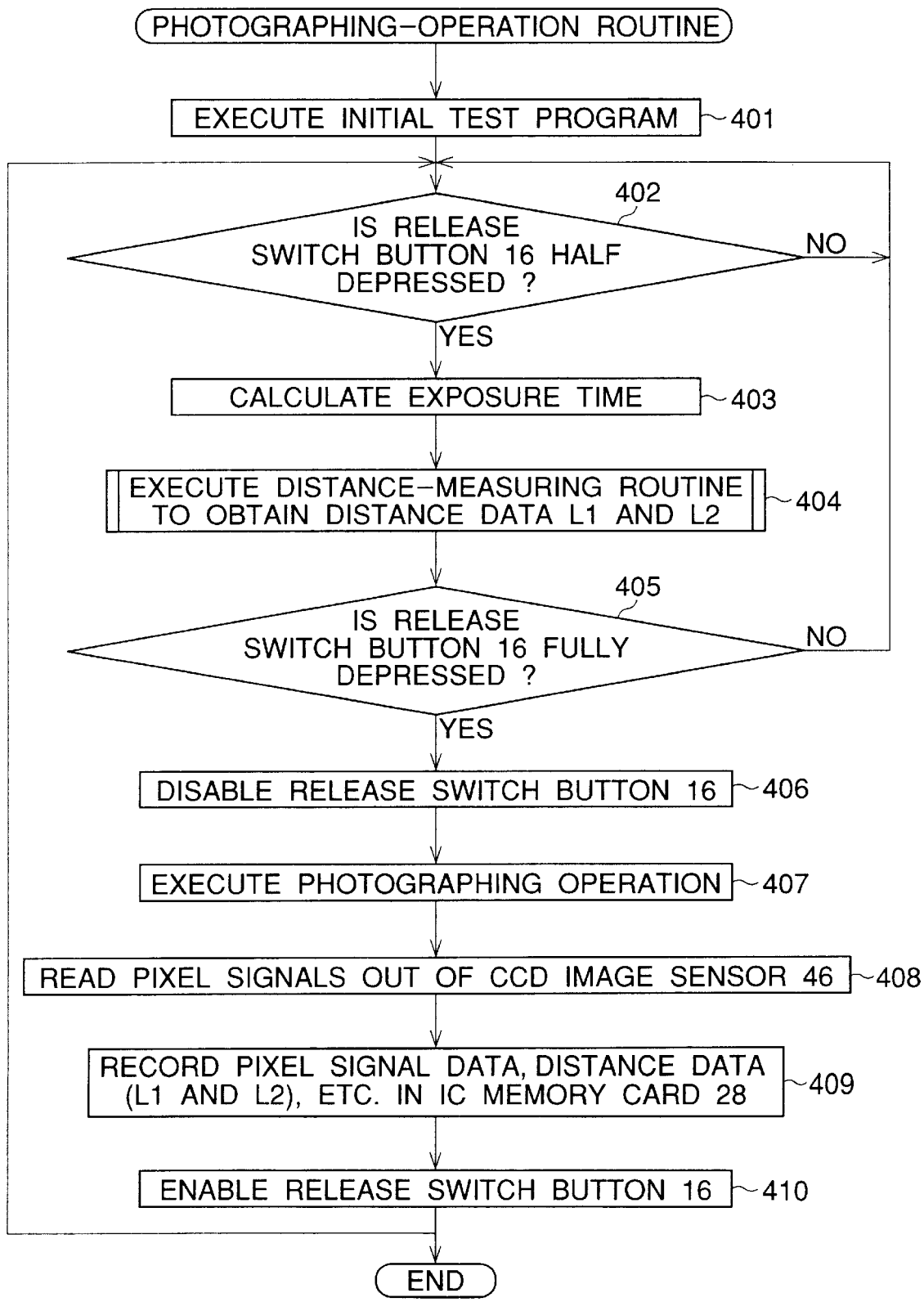
FIG. 4 is a flowchart of a photographing-operation routine executed by the electronic still video camera shown in FIG. 1.

FIG. 4 shows a flowchart for a photographing operation routine, executed in the system control circuit 42, an execution of the photographing routine being initiated by turning ON the main power switch 24 (FIG. 1).

Figure 5:
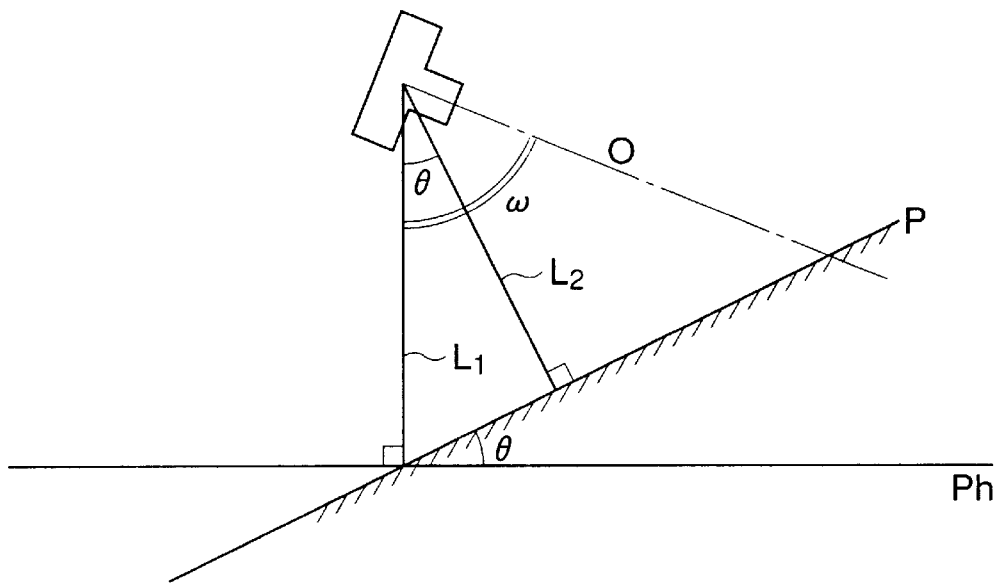
FIG. 5 is a conceptual schematic view showing a distance measurement executed by a distance-measuring sensor unit of the electronic still video camera shown in FIG. 1.

Note that, to assist in the explanation of the photographing-operation routine, as shown in FIG. 5, it is assumed that the camera is mounted on a tripod which is located on a sloping surface P of the ground, having a slope angle θ with respect to a horizontal plane Ph. Also, note that, in FIG. 5, reference L1 indicates a vertical distance between the distance-measuring sensor unit 34 and the sloping surface P of the ground, and reference L2 indicates a minimum distance between the distance-measuring sensor unit 34 and the sloping surface of the ground. Namely, the distance L1 is measured vertically from the point of intersection of horizontal plane Ph with the sloping surface P to the distance-measuring sensor unit 34, and the distance L2 is measured perpendicularly from the sloping surface P of the ground to the distance-measuring sensor unit 34.

At step 401, an initial test program is executed to determine whether or not various functions of the camera can be properly performed. When any one of the functions of the camera is improper, a massage for warning that the camera operation is irregular is displayed on the LCD panel 22.

When the camera operation is normal, the control proceeds to step 402, in which it is determined whether or not the release switch button 16 is half depressed, thereby turning ON the photometry-sensor switch 76. The determination of the half-depression of the release switch button 16 is repeatedly executed at time-intervals of, for example, 1 ms.

When it is confirmed that the release switch button 16 is half depressed, the control proceeds to step 403, in which a time of exposure or a time of electric charge accumulation is determined based on an output signal of the photometry sensor 56.

At step 404, a distance-measuring routine is executed to measure the vertical distance L1 and the minimum distance L2 by the distance-measuring sensor unit 34. Note, the distance-measuring routine will be explained in detail, with respect to a flowchart shown in FIG. 6, hereinafter.

At step 405, it is determined whether or not the release switch button 16 is fully depressed. Unless the release switch button 16 is not fully depressed after being half-depressed, the control returns from step 405 to step 402. Note, the determination of full-depression of the release switch button 16 is also repeatedly executed at time-intervals of, for example, 1 ms.

When it is confirmed that the release switch button 16 is fully depressed, thereby turning ON the release switch 78, the control proceeds to step 406, in which the release switch button 16 is disabled. Then, the control proceeds to step 407, in which a photographing operation is executed. In particular, an aperture size of the diaphragm 44 is adjusted by the iris drive circuit under control of the exposure control circuit 54 based on the output signal of the photometry sensor 56, the quick return mirror 48 subsequently being rotated upward from the down-position to the up-position. Thus, the light-receiving area of the CCD area image sensor 46 is exposed to light beams passing through the photographing optical system 12. Namely, an optical image, photographed by the photographing optical system 12, is focused and formed on the light receiving area of the CCD area image sensor 46, whereby the optical image is converted into a frame of electrical pixel signals. After a given time of exposure, i.e. a time of electric charge accumulation has elapsed, the quick return mirror 48 is returned from the up-position to the down-position.

At step 408, the frame of pixel signals are read out of the image sensor 46, and are amplified by the amplifier 60, converted to digital pixel signals by the A/D converter 62, and are processed by the image processing circuit 64, before being temporarily stored in the memory 66.

Figure 6:
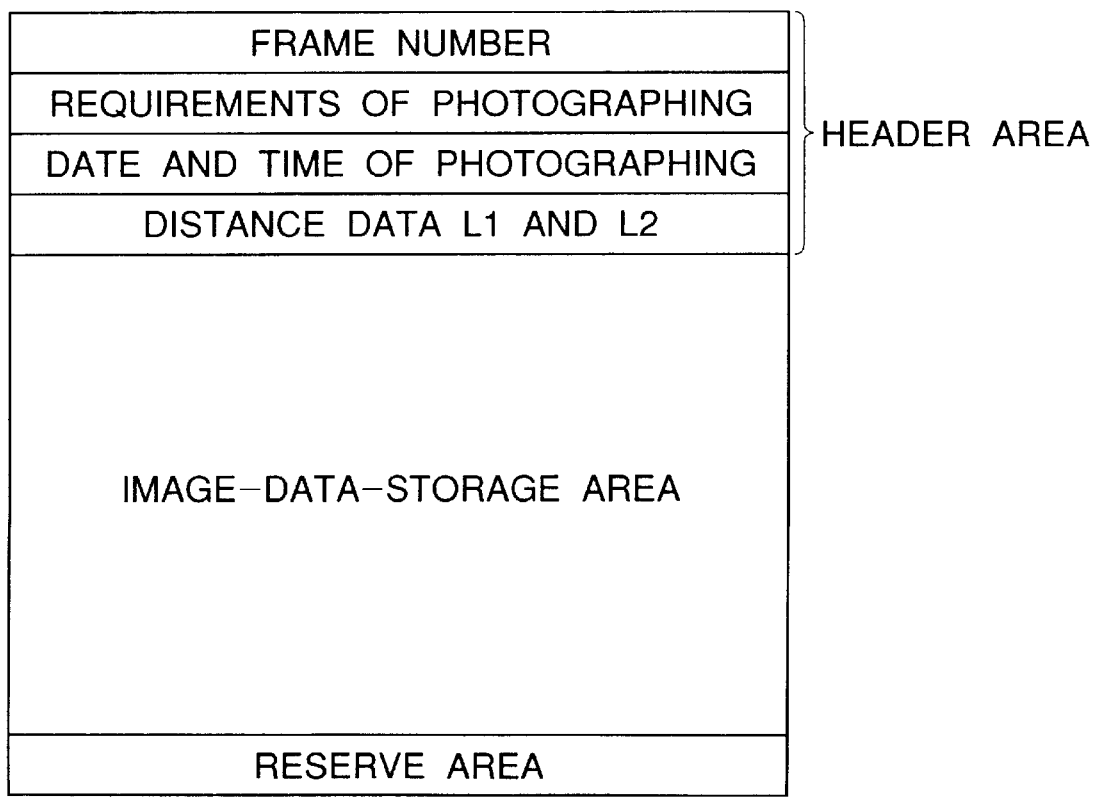
FIG. 6 is a conceptual schematic view showing an example of a format of an IC memory card, which can be loaded in the electronic still video camera shown in FIG. 1.

At step 409, the pixel signals are outputted from the memory 66 to the memory-card driver circuit 68, by which the outputted pixel signals are stored as a frame of pixel data in the IC memory card 28. At this time, the distance data L1 and L2 and other information data are also stored in the IC memory card 28. As conceptually shown in FIG. 6, a memory area of the IC memory card 28 is formatted so as to be divided into a header area and an image-data-storage area. The frame of pixel data is stored in the image-data-storage area, and the distance data L1 and L2 and other information data, such as a frame number, requirements of photographing, date and time of photographing and so on, are stored in the header area. Also, as shown in FIG. 6, the memory area of the IC memory card 28 may include a reserve area.

After the pixel data, the distance data L1 and L2, and other information data are stored in the IC memory card 28, the control proceeds to step 410, in which the release switch button 24 is enabled. Thereafter, the control returns to step 401, and is ready for a next photographing operation.

Figure 7:
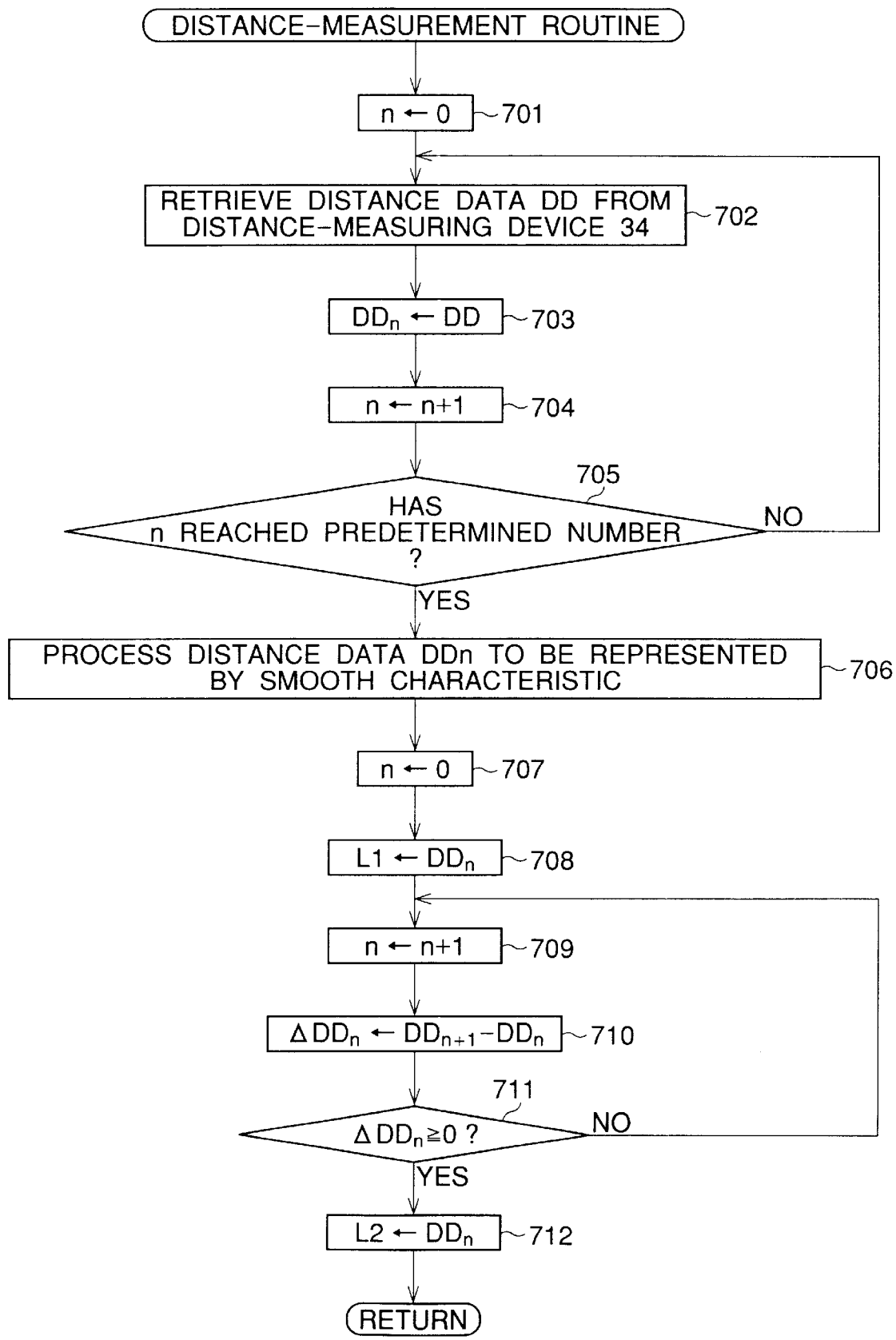
FIG. 7 is a flowchart of a distance-measurement routine forming a part of the photographing-operation routine shown in FIG. 4.

As stated above, as soon as the release switch button 24 is half depressed, the distance-measurement routine, as shown in FIG. 7, is executed at step 404 of the photographing-operation routine, shown in FIG. 4, as follows:

At step 701, a counter n is reset. Then, at step 702, distance data DD is retrieved from the light-receiver (PSD) 36 of the distance-measuring sensor unit 34 while this sensor unit 34 is rotated from the balanced position to a predetermined angular position, such that an infrared light beam, emitted from the light-emitter 36 of the distance-measuring sensor unit 34, ascends the sloping surface of the ground. Note, in FIG. 5, an angle between the balanced position (L1) and the predetermined position is indicated by reference $\omega$.

At step 703, the retrieved distance data DD is set to be $DD_n$, and the data $DD_n$ is temporarily stored in the RAM of the system control circuit 42. At step 704, a count number of the counter n is incremented by one, and, at step 705, it is determined whether or not the count number of the counter n reaches a predetermined number, corresponding to the angle $\omega$. If the count number of the counter n has not reached the predetermined number, the control returns from step 705 to step 702, and the routine comprising steps 702 to 705 is repeated until the count number of the counter n reaches the predetermined number. Note, the retrieval of the distance data DD from the light-receiver (PSD) 36 is executed at time-intervals of, for example, 1 ms.

Figure 8:
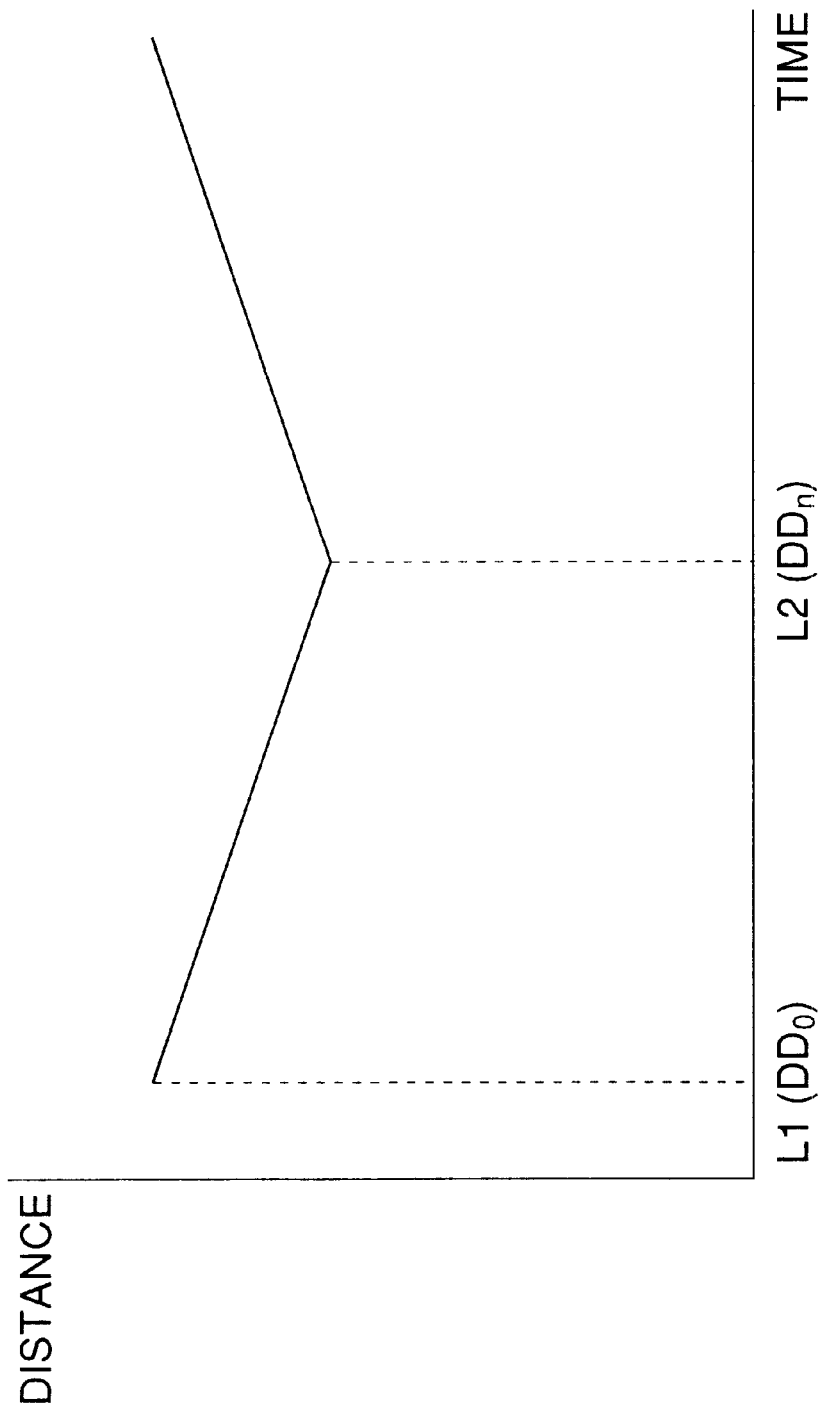
FIG. 8 is a graph representing a smooth characteristic curve obtained by processing a series of distance data, measured by the distance-measuring sensor unit of the electronic still video camera of FIG. 1.

When the count number of the counter n reaches the predetermined number, the control proceeds from step 705 to step 706, in which the series of distance data $DD_n$ is processed so as to exhibit a smooth characteristic curve as shown by the graph of FIG. 8.

At step 707, the counter n is reset. Then, at step 708, the distance data $DD_{n=0}$ is set as L1, and this vertical distance data L1 is temporarily stored in the RAM of the system control circuit 42. Note, as is apparent from the foregoing, since the distance-measuring unit 34 is at the balanced position just before the electric motor 40 is driven, the distance data $DD_{n=0}$ corresponding to the vertical distance L1, as shown in FIG. 5.

At step 709, the count number of the counter n is incremented by one. Then, at step 710, the following calculation is executed:

$$\Delta DD_n \leftarrow DD_{n+1} - DD_n$$

At step 711, it is determined whether or not the calculated resultant $\Delta DD_n$ is greater than or equal to zero. If $\Delta DD_n < 0$, the control returns from step 711 to step 709. Namely, the routine comprising step 709 to 711 is repeated until the $\Delta DD_n$ is equal to or more than zero.

At step 711, when the $\Delta DD_n$ is equal to or more than zero, or when the minimum distance $DD_n$ is determined, the control proceeds from step 711 to step 712, in which the minimum distance $DD_n$ is set to L2, and this minimum distance data L2 is temporarily stored in the RAM of the system control circuit 42. Thereafter, the control returns to step 406 of the flowchart of FIG. 4.

Figure 9:
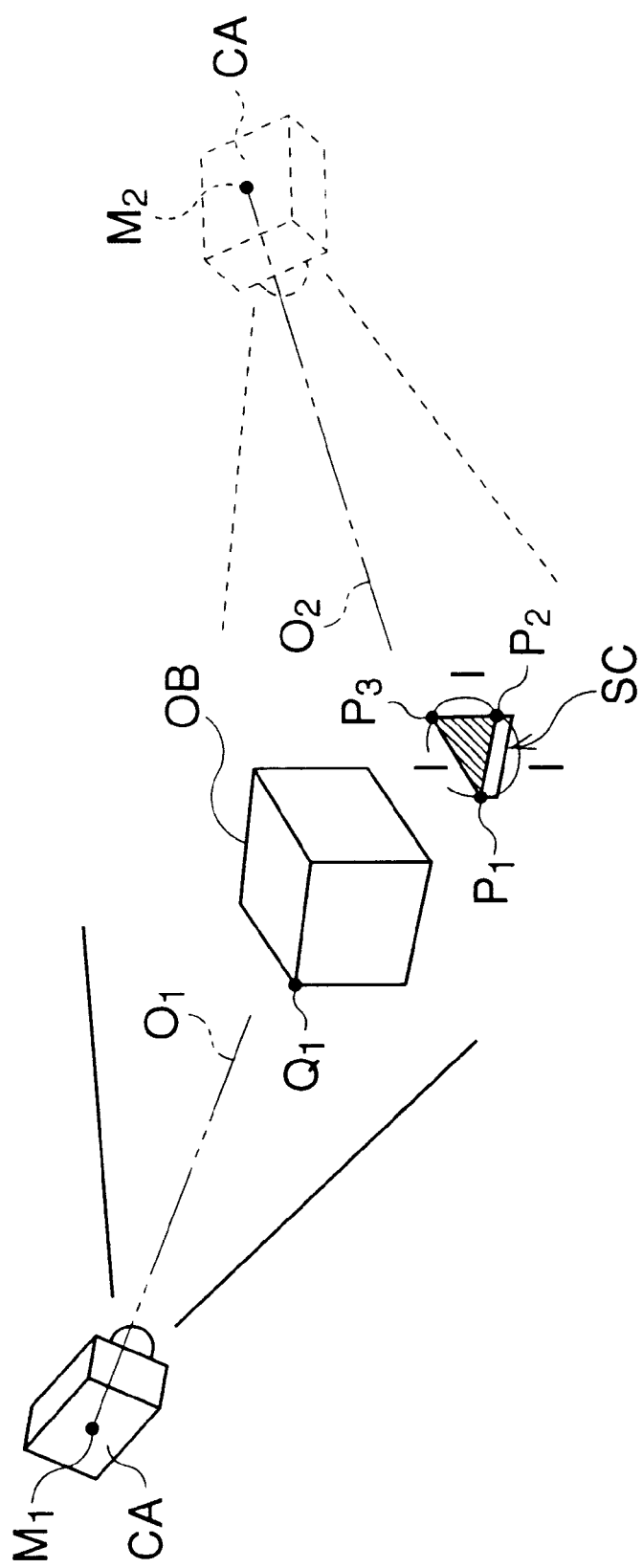
FIG. 9 is a conceptual perspective view showing a photogrammetric measurement system using the electronic still video camera of FIG. 1.

FIG. 9 conceptually shows a photogrammetric measurement system, using the camera constructed according to the present invention. In this drawing, a cubic object OB is situated at a spot to be photogrammetrically measured, and a standard measurement scale SC is placed beside the cubic object OB. The standard measurement scale SC and the cubic object OB are photographed in two different directions by the camera, indicated by reference CA. Namely, as shown in FIG. 9, the standard scale SC and the cubic object OB are photographed by the camera CA placed at a first photographing position $M_1$, shown by a solid line, and are then photographed by the camera CA placed at a second photographing position $M_2$, shown by a broken line. At the first photographing position $M_1$, an optical axis of the camera CA is indicated by reference $O_1$, and, at the second photographing position $M_2$, the optical axis of the camera CA is indicated by reference $O_2$.

Note, each of the first and second photographing positions $M_1$ and $M_2$ may be defined as a back principal point of the photographing optical system (12) of the camera CA.

In the example shown in FIG. 9, the standard measurement scale SC is shaped as an equilateral-triangular plate member, and has three reference points $P_1$, $P_2$ and $P_3$ positioned in the vicinity of the apexes of the equilateral-triangular plate member, such that an equilateral triangle is defined by the reference points $P_1$, $P_2$ and $P_3$, as shown by a hatched area in FIG. 9. The hatched area is utilized as a reference plane, and the sides of the equilateral triangle, defined by the reference points $P_1$, $P_2$ and $P_3$, have a predetermined length of l, which is utilized as a standard measurement length.

When the spot to be measured is sloped so as to define an angle $\theta$ with respect to the horizontal plane, as shown in FIG. 5, the hatched reference plane defined by the points $P_1$, $P_2$ and $P_3$ is also inclined by the angle e with respect to the horizontal plane.

Note, of course, three respective cone-shaped markers, which are identical to each other, may be positioned at suitable locations, in place of the standard measurement scale SC. In this case, a distance between two apexes of the cone-shaped markers is previously measured, for example, by a measuring tape, and is set as the standard measurement length. Also, a plane, defined by the three apexes of the cone-shaped markers, is utilized as the reference plane.

Figure 10:
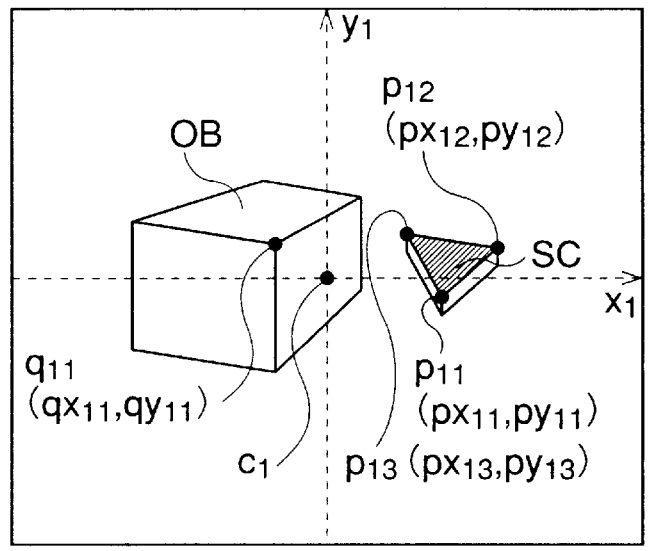
FIG. 10 is a conceptual view showing a picture photographed at a first photographing position in the measurement system of FIG. 9.

FIG. 10 shows a first picture photographed by the camera CA at the first photographing position $M_1$. As is apparent from this drawing, a rectangular $x_1$–$y_1$ coordinate system is defined on the first picture, and an origin $c_1$ of the $x_1$–$y_1$ coordinate system is at the photographed center of the first picture. In this coordinate system, the reference points $P_1$, $P_2$ and $P_3$ are represented by coordinates $p_{11}$ ($px_{11}$, $py_{11}$), $p_{12}$ ($px_{12}$, $py_{12}$) and $p_{13}$ ($px_{13}$, $py_{13}$), respectively.

Figure 11:
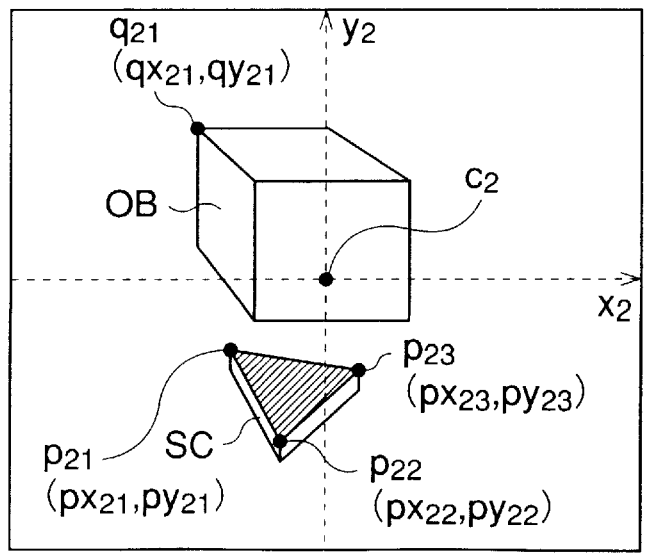
FIG. 11 is a conceptual view showing another picture photographed at a second photographing position in the measurement system of FIG. 9.

FIG. 11 shows a second picture photographed by the camera CA at the second photographing position $M_2$. As is apparent from this drawing, a rectangular $x_2$–$y_2$ coordinate system is defined on the second picture, and an origin $c_2$ of the $x_2$–$y_2$ coordinate system is at the photographed center of the second picture. In this coordinate system, the reference points $P_1$, $P_2$ and $P_3$ are represented by coordinates $p_{21}$ ($px_{21}$, $py_{21}$), $p_{22}$ ($px_{22}$, $py_{22}$) and $p_{23}$ ($px_{23}$, $py_{23}$) respectively.

Figure 12:
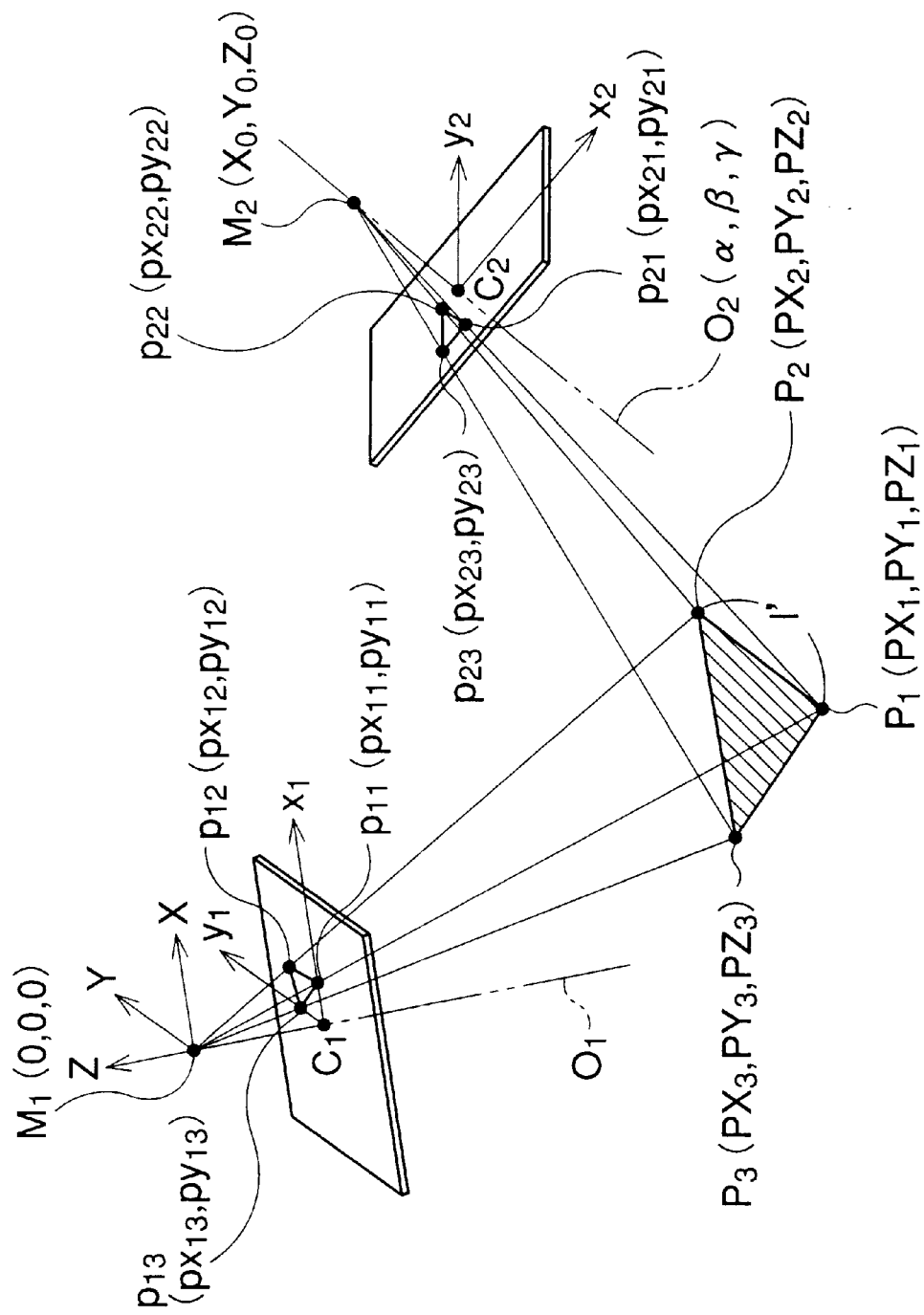
FIG. 12 is a conceptual view showing a relative-positional relationship between the standard scale and the first and second pictures from FIGS. 10 and 11, respectively.

FIG. 12 shows a relative-positional three-dimensional relationship between the standard scale SC, the camera CA, and the first and second pictures. In this case, the standard scale SC is relatively reproduced on the basis of the first and second pictures placed at the first and second photographing positions $M_1$ and $M_2$, but a size of the standard scale SC is also relative. Thus, a length of the sides of the equilateral triangle, defined by the reference points $P_1$, $P_2$ and $P_3$, is indicated by l'.

In order to calculate three-dimensional coordinates of the cubic object OB, it is necessary to define an X-Y-Z three-dimensional coordinate system, as shown in FIG. 12, and the reference points $P_1$, $P_2$ and $P_3$ of the standard scale SC, recorded on each of the first and second pictures, must be positionally determined with respect to the three-dimensional coordinate system.

As shown in FIG. 12, an origin of the three-dimensional coordinate system is at the first photographing position $M_1$. Namely, the first photographing position $M_1$ is represented by the origin coordinates (0, 0, 0) of the three-dimensional coordinate system. Also, a Z-axis of the three-dimensional coordinate system coincides with the optical axis $O_1$ of the camera CA placed at the first photographing position $M_1$. The second photographing position $M_2$ is represented by coordinates ($X_0$, $Y_0$, $Z_0$), and the optical axis $O_2$ of the camera CA placed at the second photographing position $M_2$ is represented by angular coordinates ($\alpha$, $\beta$, $\gamma$). Namely, the optical axis $O_2$ of the camera CA defines angles of $\alpha$, $\beta$ and $\gamma$ with the X-axis, Y-axis and Z-axis of the three-dimensional coordinate system, respectively.

The reference points $P_1$, $P_2$ and $P_3$ of the standard scale SC are represented by three-dimensional coordinates $P_j$ ($PX_j$, $PY_j$, $PZ_j$) (j=1, 2, 3). As shown in FIG. 12, each of the reference points [$P_1$ ($PX_1$, $PY_1$, $PZ_1$), $P_2$ ($PX_2$, $PY_2$, $PZ_2$) and $P_3$ ($PX_3$, $PY_3$, $PZ_3$)], the image point [$p_{11}$ ($px_{11}$, $py_{11}$) $p_{12}$ ($px_{12}$, $py_{12}$), $p_{13}$ ($px_{13}$, $py_{13}$)] of the corresponding reference point recorded on the first picture, and the back principal point ($M_1$) of the camera CA are aligned with each other on a straight axis. Similarly, each of the reference points [$P_1$ ($PX_1$, $PY_1$, $PZ_1$), $P_2$ ($PX_2$, $PY_2$, $PZ_2$) and $P_3$ ($PX_3$, $PY_3$, $PZ_3$)], the image point [$p_{21}$ ($px_{21}$, $py_{21}$), $p_{22}$ ($px_{22}$, $py_{22}$), $p_{23}$ ($px_{23}$, $py_{23}$)] of the corresponding reference point recorded on the second picture, and the back principal point ($M_2$) of the camera CA are aligned with each other on a straight axis.

Accordingly, the three-dimensional coordinates $P_j$ ($PX_j$, $PY_j$, $PZ_j$) can be determined by the following collinear equations:

$$PX_j = (PZ_j - Z_0)a_{11}px_{ij} + a_{21}py_{ij} - \frac{a_{31}C}{a_{13}px_{ij} + a_{23}py_{ij} - a_{33}C} + X_0$$

$$PY_j = (PZ_j - Z_0)a_{12}px_{ij} + a_{22}py_{ij} - \frac{a_{32}C}{a_{13}px_{ij} + a_{23}py_{ij} - a_{33}C} + Y_0$$

$$(i = 1, 2; j = 1, 2, 3)$$

Herein:

$a_{11}$=cos $\beta$*sin $\gamma$ $a_{12}$=–cos $\beta$*sin $\gamma$ $a_{13}$=sin $\beta$ $a_{21}$=cos $\alpha$*sin $\gamma$+sin $\alpha$*sin $\beta$*cos $\gamma$ $a_{22}$=cos $\alpha$*cos $\gamma$+sin $\alpha$*sin $\beta$*sin $\gamma$ $a_{23}$=–sin $\alpha$*sin $\beta$ $a_{31}$=sin $\alpha$*sin $\gamma$+cos $\alpha$*sin $\beta$*cos $\gamma$ $a_{32}$=sin $\alpha$*cos $\gamma$+cos $\alpha$*sin $\beta$*sin $\gamma$ $a_{33}$=cos $\alpha$*cos $\beta$ Note that, in these equations, C indicates a principal focal length of the camera CA, which is defined as a distance between the back principal point ($M_1$) and the photographing center ($c_1$) of the first picture, and a distance between the back principal point ($M_2$) and the photographing center ($c_2$) of the second picture. Also note, i corresponds to a number of the pictures; and j corresponds to a number of the reference points $P_1$, $P_2$ and $P_3$ of the standard scale SC.

As already mentioned above, when the first picture has been photographed by the camera CA at the first photographing position $M_1$, image-pixel data of the first picture is stored, together with distance data (L1 and L2) and other information data, in the IC memory card 28. Similarly, when the second picture has been photographed by the camera CA at the second photographing position $M_1$, image-pixel data of the second picture is stored, together with distance data (L1 and L2) and other information data, in the IC memory card 28.

Figure 13:
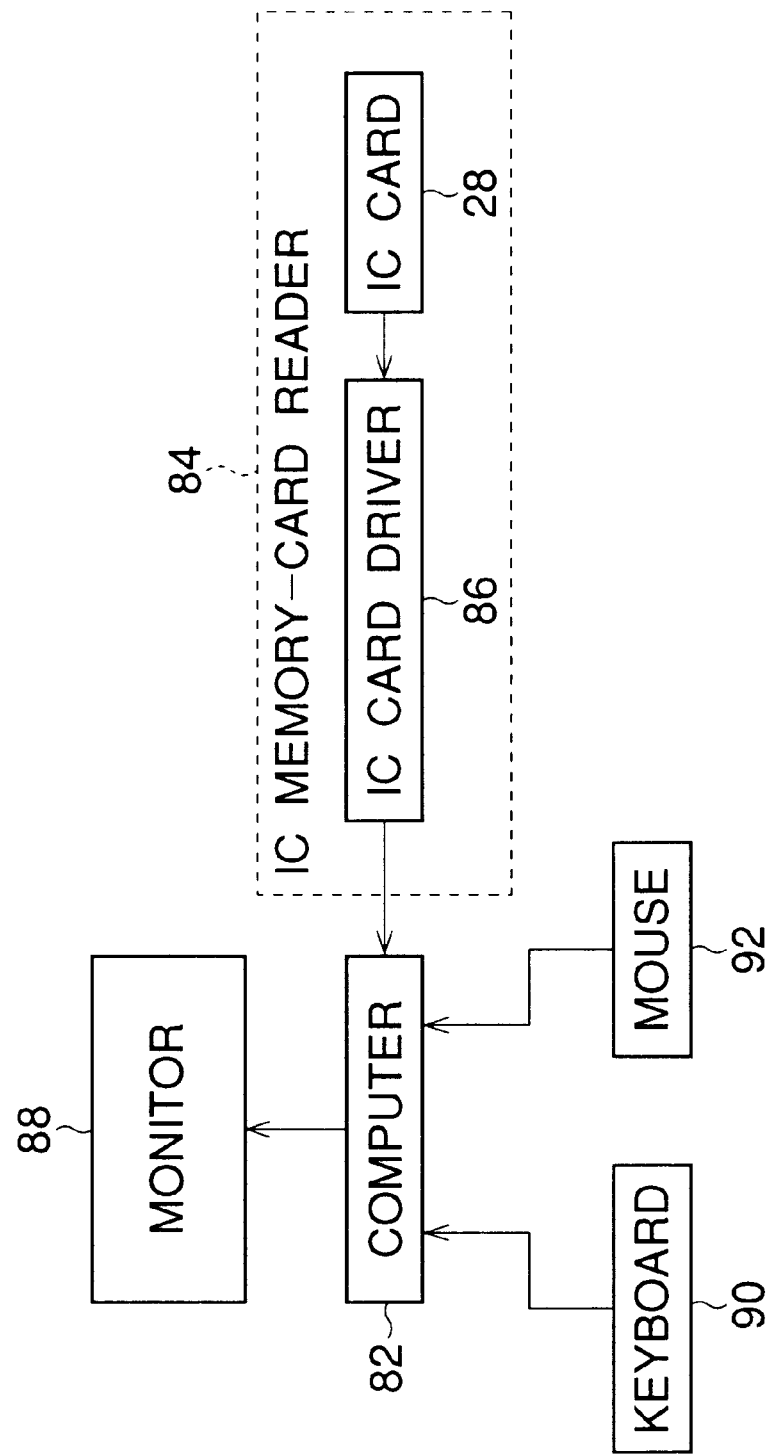
FIG. 13 is a block diagram of a computer system, in which a photogrammetric measurement is performed, according to the present invention.

FIG. 13 shows a block diagram of a computer system, in which the photogrammetric measurement as mentioned above is performed on the basis of the image-pixel data and the distance data (L1 and L2) stored in the IC memory card 28.

As shown in FIG. 13, the computer system comprises a computer 82 having a photogrammetric measurement program installed therein, and an IC memory card reader 84 connected to the computer 82. The IC memory card reader 84 is provided with a slot for receiving the IC memory card 28, and includes an IC card driver 86 for reading a given frame of image-pixel data, distance data (L1 and L2) and other information data. The computer system further comprises a monitor 88 for reproducing a photographed picture on the basis of the frame of image-pixel data read from the IC memory card 28, a keyboard 90 for inputting various command signals and various data to the computer 82, and a mouse 92 for manipulating a cursor displayed on the monitor 88.

Figure 14:
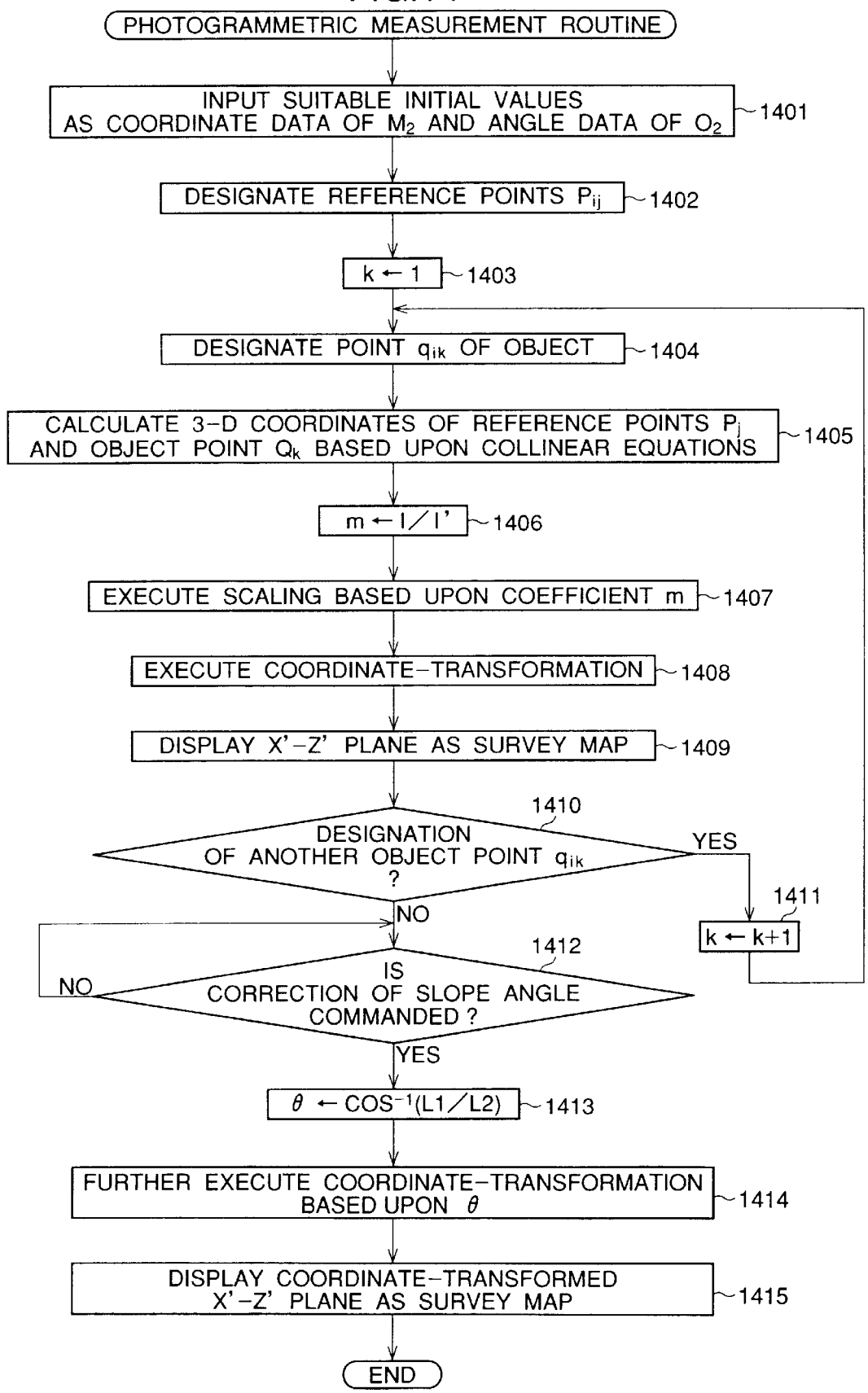
FIG. 14 is a flowchart of a photogrammetric measurement routine for producing a survey map on the basis of the first and second pictures shown in FIGS. 10 and 11.

FIG. 14 shows a flowchart for a photogrammetric measurement routine, executed in the computer 82, shown in FIG. 13, in which a survey map is developed based on the first and second pictures, shown in FIGS. 10 and 11. Before the execution of the routine, the two frames of image-pixel data of the first and second pictures are read from the IC memory card 28, and the first and second pictures are simultaneously reproduced and displayed on the monitor 88, as shown in FIGS. 10 and 11.

At step 1401, as coordinate data $(X_0, Y_0, Z_0)$ of the second photographing position $M_2$ and as angular coordinate data $(\alpha, \beta, \gamma)$ of the optical axis $O_2$, suitable initial values (except for zero) are inputted to the computer 82 through the keyboard 90. Then, at step 1402, the respective reference points $p_{ij}$ ($px_{ij}$, $py_{ij}$) are successively designated, on the first and second pictures displayed on the monitor 88, with the cursor manipulated by the mouse 92. Namely, the two sets of coordinates $p_{11}$ ($px_{11}$, $py_{11}$) and $p_{21}$ ($px_{21}$, $py_{21}$), the two sets of coordinates $p_{12}$ ($px_{12}$, $py_{12}$) and $p_{22}$ ($px_{22}$, $py_{22}$), and the two sets of coordinates $p_{13}$ ($px_{13}$, $py_{13}$) and $p_{23}$ ($px_{23}$, $py_{23}$) are retrieved by a central processing unit (CPU) of the computer 82.

After the designation of the reference points $p_{ij}$ ($px_{ij}$, $py_{ij}$), at step 1402, a counter k is set to 1. Then, at setp 1404, a suitable point $Q_{1(k-1)}$ of the cubic object OB is selected, and image points $q_{ik}$ (FIGS. 10 and 11) of the point $Q_1$, displayed on the first and second pictures of the monitor 88, are designated with the cursor manipulated by the mouse 92. Namely, the two sets of coordinates $q_{11}$ ($qx_{11}$, $qy_{11}$) and $q_{21}$ ($qx_{21}$, $qy_{21}$) of the image point $Q_1$ are retrieved by the central processor of the computer 82.

At step 1405, the above-mentioned collinear equations are solved on the basis of the retrieved coordinates, and the three-dimensional coordinates $P_j$ ($PX_j$, $PY_j$, $PZ_j$) of the reference points $P_1$, $P_2$ and $P_3$, and the three-dimensional coordinates $Q_1$ ($QX_1$, $QY_1$, $QZ_1$) of the object point $Q_1$ are determined. Then, primary-approximate data of the three-dimensional coordinates $(X_0, Y_0, Z_0)$ of the second photographing position $M_2$ and the angle coordinates $(\alpha, \beta, \gamma)$ of the optical axis $O_2$ are determined, i.e. the initial coordinate data $(X_0, Y_0, Z_0)$ and the initial angular coordinate data $(\alpha, \beta, \gamma)$, inputted at step 1401, are renewed by the primary-approximate data.

At step 1406, a coefficient m is calculated as follows:

$$m \leftarrow l/l'$$

Note, l is the real length between the reference points $P_1$, $P_2$ and $P_3$, and l' is the relative length obtained from the determined three-dimensional coordinates $P_j$ ($PX_j$, $PY_j$, $PZ_j$).

At step 1407, scaling is executed, using the coefficient m, between the determined three-dimensional coordinates $P_j$ ($PX_j$, $PY_j$, $PZ_j$) and $Q_1$ ($QX_1$, $QY_1$, $QZ_1$), so as to obtain a real spatial relationship therebetween. Then, at step 1408, the X-Y-Z three-dimensional coordinate system is transformed into an X'-Y'-Z' three-dimensional coordinate system, defined as shown in FIG. 15.

Figure 15:
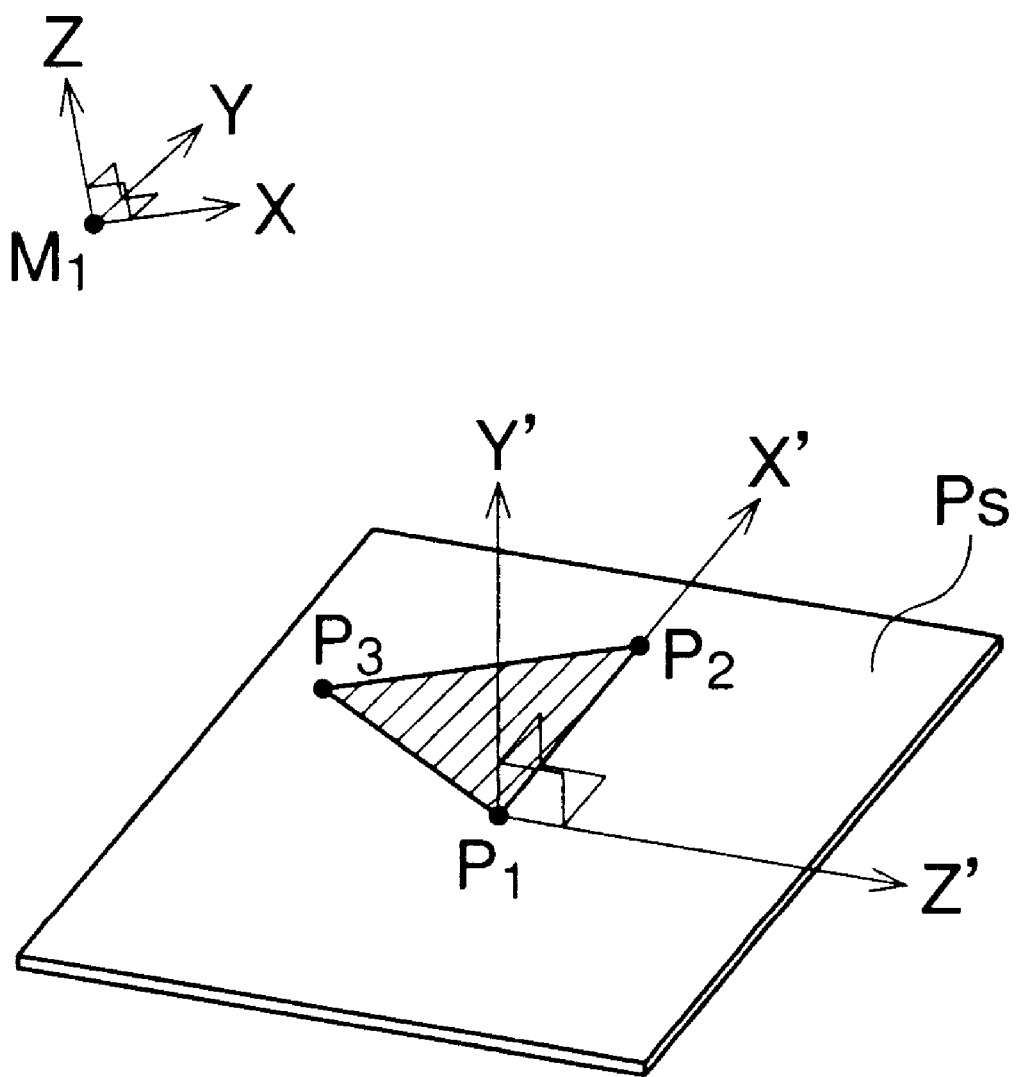
FIG. 15 is a conceptual perspective view of a three-dimensional coordinate system for producing the survey map.

As is apparent from FIG. 15, an origin of the X'-Y'-Z' three-dimensional coordinate system is at the reference point $P_1$, and the X'-axis thereof is defined by the reference points $P_1$ and $P_2$. Also, The X'- and Z'- axes of the coordinate system define a plane Ps, which includes the hatched triangular plane area or reference area defined by the reference points $P_1$, $P_2$ and $P_3$. In the example of FIG. 15, although the origin of the X'-Y'-Z' three-dimensional coordinate system coincides with the reference point $P_1$, the origin may be at any location included in the plane Ps.

At step 1409, the X'-Z' plane or plane Ps, on which the reference points $P_1$, $P_2$ and $P_3$ and the object point $Q_1$ are recorded, is displayed as a survey map on the monitor 88. Nevertheless, the displayed survey map is not accurate, because the renewed coordinate data $(X_0, Y_0, Z_0)$ and angular coordinate data $(\alpha, \beta, \gamma)$ are not sufficiently approximated.

At step 1410, it is determined whether or not another set of points $q_{1k}$ and $q_{2k}$ should be designated with respect to the cubic object OB. When the other set of points $q_{1k}$ and $q_{2k}$ should be further designated, i.e. when the renewed coordinate data $(X_0, Y_0, Z_0)$ and angular coordinate data $(\alpha, \beta, \gamma)$ are not sufficiently approximated, at step 1411, the counter k is incremented by 1. Thereafter, the routine comprising steps 1404 to 1410 is again executed.

Before the approximation of the coordinate data $(X_0, Y_0, Z_0)$ and angular coordinate data $(\alpha, \beta, \gamma)$ is acceptable, it is necessary to designate at least two sets of points $q_{1k}$ and $q_{2k}$ with respect to the cubic object OB, i.e. the approximation calculation should be repeated at least twice. Preferably, more than two sets of object points $q_{1k}$ and $q_{2k}$ should be designated, i.e. the approximation calculation should be repeated more than twice.

At step 1410, when a further set of points $q_{1k}$ and $q_{2k}$ need not be designated, i.e. when the renewed coordinate data $(X_0, Y_0, Z_0)$ and angular coordinate data $(\alpha, \beta, \gamma)$ are sufficiently approximated, the control proceeds from step 1410 to step 1412, in which it is determined whether or not a correction of a slope angle of the ground surface is commanded by an operator through the keyboard 90 or mouse 92.

If the command signal for correcting the slope angle of the ground surface is inputted to the computer 82, the control proceeds from step 1412 to step 1413, in which the following calculation is performed:

$$\theta \leftarrow \cos^{-1}(L1/L2)$$

Namely, the slope angle $\theta$ of the ground surface, i.e. the plane Ps, is calculated on the basis of the vertical distance data L1 and the minimum distance data L2 measured by the distance-measuring sensor unit 34, for example, at the first photographing position $M_1$.

At step 1414, the X'-Y'-Z' three-dimensional coordinate system is further transformed such that the slope angle θ substantially becomes zero, i.e. the plane Ps coincides substantially with the horizontal plane. Then, at step 1415, the transformed X'-Z' plane or plane Ps, on which the reference points $P_1$, $P_2$ and $P_3$, and the object point $Q_k$ are recorded, is displayed as a slope-angle-corrected survey map on the monitor 88. Thus, this routine is completed.

Note, of course, the slope angle θ of the ground surface, i.e. the plane Ps, may be calculated based on the vertical distance data L1 and the minimum distance data L2, measured by the distance-measuring sensor unit 34 at the first photographing position $M_2$, and an average of the slope angles θ obtained from the two sets of vertical distance data L1 and minimum distance data L2, measured at the first and second photographing positions $M_1$ and $M_2$, may be used for the further coordinate-transformation of the X'-Y'-Z' three-dimensional coordinate system.

Figure 16:
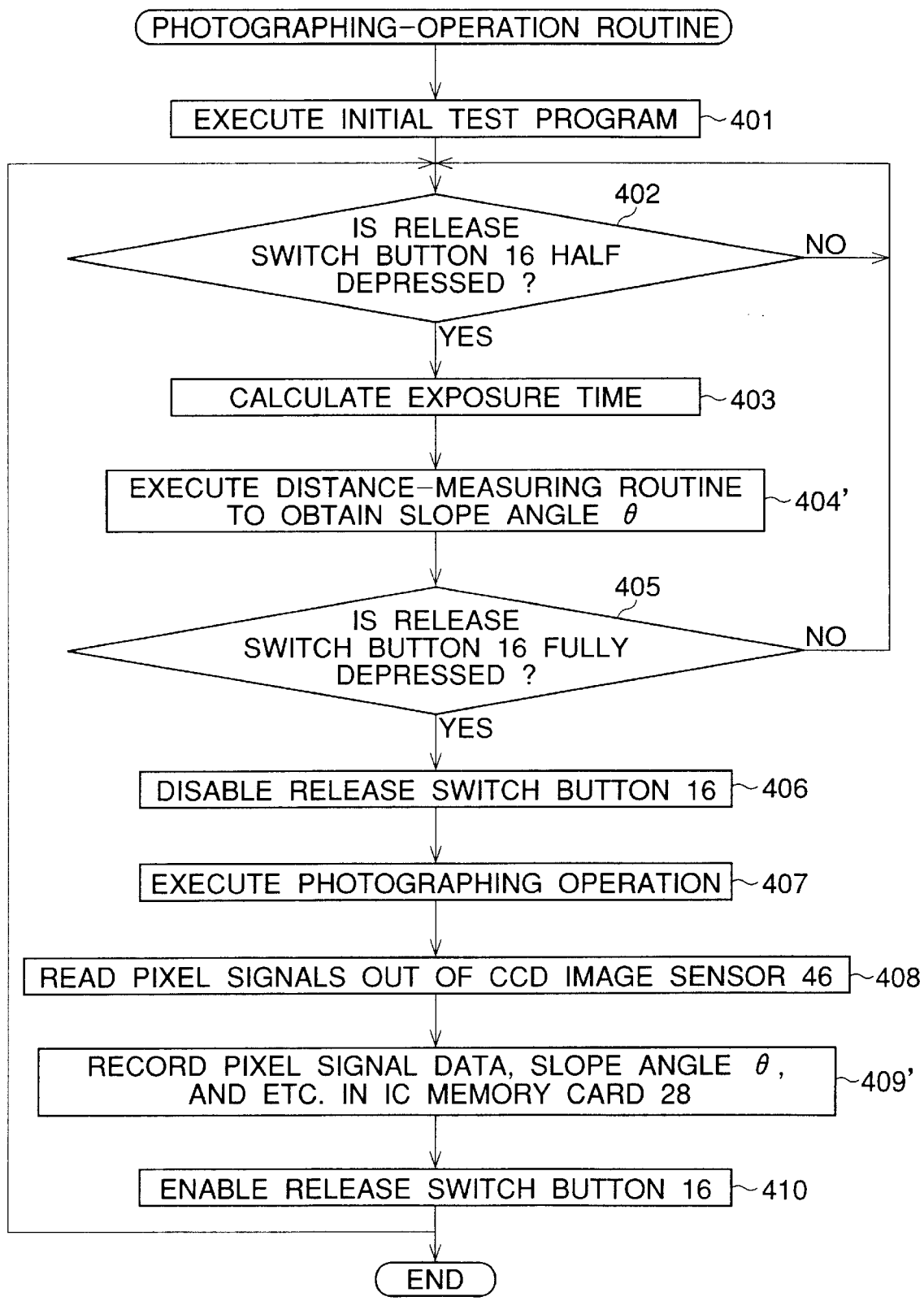
FIG. 16 is a flowchart showing a modification of the flowchart of FIG. 4.
Figure 17:
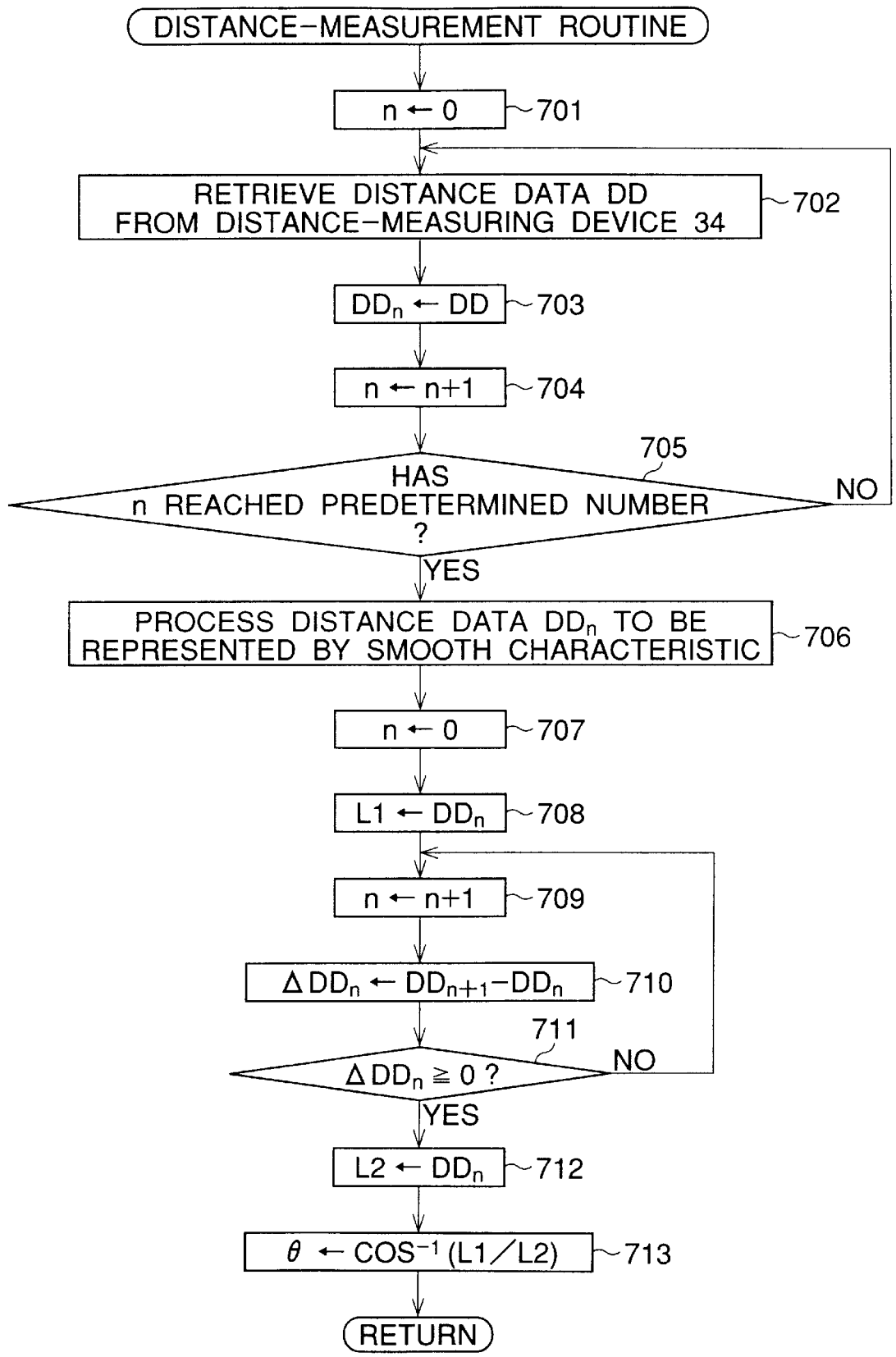
FIG. 17 is a flowchart showing a modification of the flowchart of FIG. 7.

In the embodiment as mentioned above, although the vertical distance data L1 and the minimum distance data L2 are stored in the IC memory card 28, the slope angle θ may be calculated in the system control circuit 42 of the camera. In this case, the flowchart of FIG. 4 and the flowchart of FIG. 7 should be partially modified, as shown by FIGS. 16 and 17, respectively. Namely, as shown in FIG. 16, step 404 should be modified, as shown by step 404', and step 409 should be modified, as shown by step 409'. Further, as shown in FIG. 17, step 713 should included in the distance-measurement routine of FIG. 7.

Especially, the camera with the distance-measuring sensor unit 34, according to the present invention, is advantageously used when plural survey maps are combined with each other to produce a wide survey map.

Figure 18:
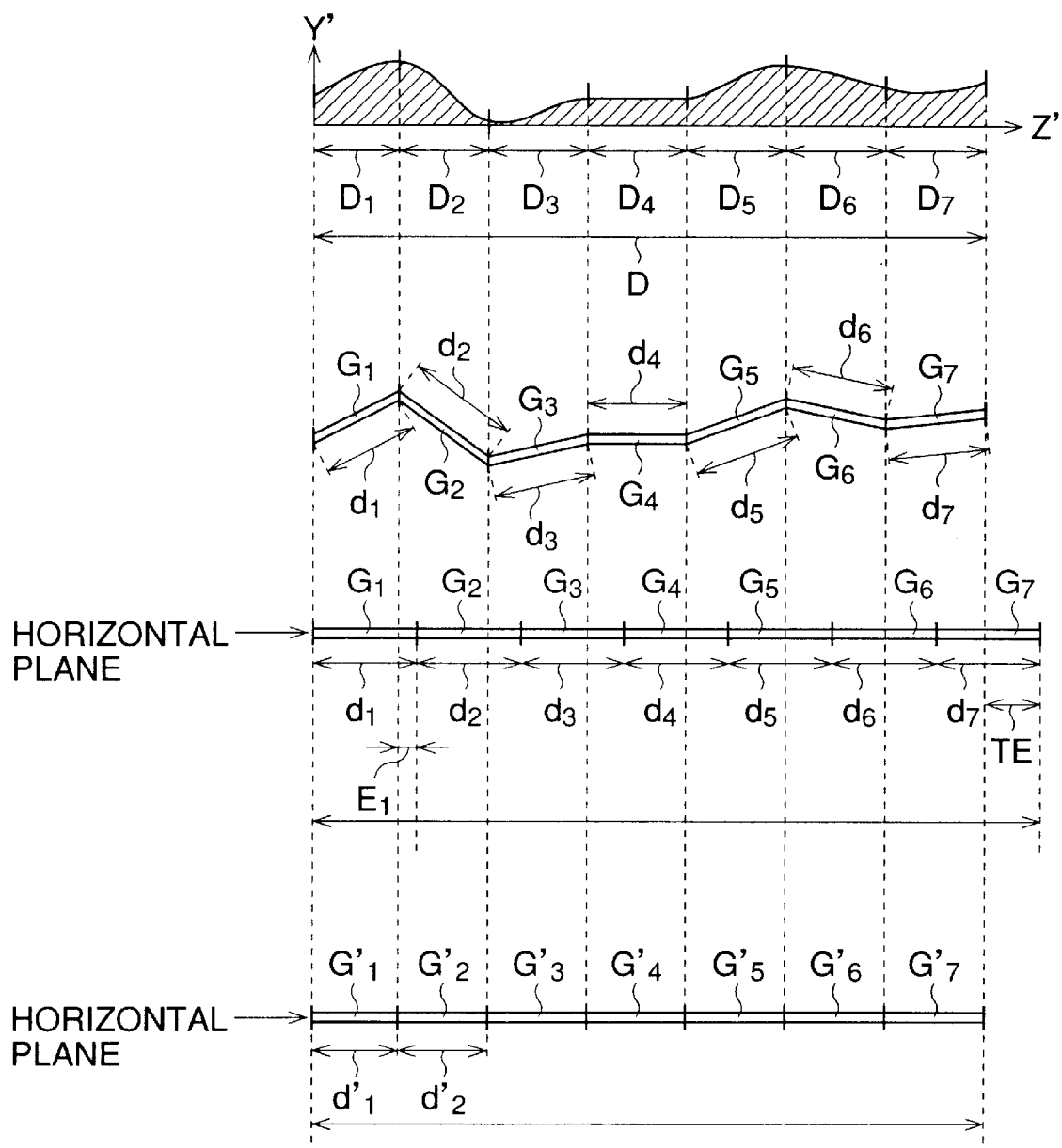
FIG. 18 is a conceptual view showing a method for producing a wide survey map by combining plural survey maps.

In particular, for example, as shown in FIG. 18, when a geographical area D, to be widely measured, has a sloped profile, as indicated by hatching, along the Y'-Z' plane of the X'-Y'-Z' three dimensional coordinate system, the geographical area D is divided into seven sections $D_1$ to $D_7$, in accordance with the nature of the sloped profile.

In each of the sections $D_1$ to $D_7$, when a survey map $G_t$ (t=1, 2, . . . , 6, 7) is formed in the conventional manner as mentioned above, i.e. when the survey map $G_t$ is obtained without the correction of the slope angle θ of the ground surface, it has a length of $d_t$ along the Z'-axis of the X'-Y'-Z' three dimesional corrdinate system.

If the survey maps $G_1$ to $G_7$ are combined with each other to produce a wide survey map in such a manner that they are extended and developed over the horizontal plane Ph (FIG. 5), each survey map $G_t$ has a length longer than an actual length of the corresponding section $D_t$, and a difference therebetween may be defined as an error length $E_t$. For example, the survey map $G_1$ has an error length $E_1$. Thus, the side survey map has a total error length TE, defined as follows:

$$TE=(d_1+d_2+d_3+d_4+d_5+d_6+d_7)-D$$

However, a wide survey map, obtained according to the present invention, does not have an error length, because the X'-Y'-Z' three-dimensional coordinate system is transformed such that the slope angle θ substantially becomes zero, i.e. the plane Ps coincides substantially with the horizontal plane Ph.

In particular, when each of the survey maps $G_t$ is converted into a survey map $G_t'$, defined on the horizontal plane Ph, due to the coordinate-transformation of the X'-Y'-Z' three-dimensional coordinate system, a length $d_t'$ of each survey map $G_t'$ is substantially equal to that of the corresponding section $D_t$. In short, according to the present invention, it is possible to produce a survey map with much greater precision.

According to another aspect of the present invention, a survey map can be produced in either the X'-Y' plane or the Y'-Z' plane of the X'-Y'-Z' three dimensional coordinate system, by utilizing the vertical distance data L1 obtained upon photographing by the camera CA. Namely, it is possible to calculate a height of the cubic object based on the vertical distance data, to thereby enable the production of the survey map in either the X'-Y' plane and the Y'-Z' plane of the X'-Y'-Z' three dimensional coordinate system.

Finally, it will be understood by those skilled in the art that the foregoing description is of the preferred embodiments of the device, and that various changes and modifications may be made to the present invention without departing from the spirit and scope thereof.

The present disclosure relates to subject matter contained in Japanese Patent Applications No. 9-11984 (filed on Jan. 7, 1997), and No. 9-264990 (filed on Sep. 11, 1997) which are expressly incorporated herein, by reference, in their entireties.

We claim:

1. A camera for use in a photogrammetric analytical measurement, comprising a distance-measuring sensor unit for measuring a vertical distance between said camera and a sloping surface of a ground and a minimum distance between said camera and the sloping surface of said ground when placing said camera above the sloping surface of said ground wherein said distance-measuring sensor unit is freely rotatable around an axis perpendicular to an optical axis of a photographing optical system of said camera, and is constituted such that said distance-measuring sensor unit enables a measurement of said vertical distance at a balance position at which said distance-measuring sensor unit is balanced due to gravity.

2. A camera as set forth in claim 1, further comprising a memory medium for storing said vertical distance and said minimum distance as vertical distance data and minimum distance data, respectively.

3. A camera as set forth in claim 2, wherein said memory medium further stores image data obtained by photography.

4. A camera as set forth in claim 1, further comprising a calculator for calculating a slope angle of the sloping surface of said ground based on said vertical distance and said minimum distance, and a memory medium for storing the calculated slope angle as slope-angle data.

5. A camera as set forth in claim 4, wherein said memory medium further stores image data obtained by photography.

6. A camera as set forth in claim 4, wherein said memory medium further stores said vertical distance as vertical distance data.

7. A camera as set forth in claim 1, wherein said distance-measuring sensor unit is rotated from said balanced position to another position for a measurement of said minimum distance.

8. A camera for use in a photogrammetric analytical measurement, comprising distance-measuring sensor means for measuring a vertical distance between said camera and a sloping surface of a ground and a minimum distance between said camera and the sloping surface of said ground when placing said camera above the sloping surface of said ground, wherein said distance-measuring sensor means is freely rotatable around an axis perpendicular to an optical axis of a photographing optical system of said camera, and is constituted such that said distance-measuring sensor means enables a measurement of said vertical distance at a balance position at which said distance-measuring sensor means is balanced due to gravity.

9. A camera as set forth in claim 8, further comprising memory means for storing said vertical distance and said minimum distance as vertical distance data and minimum distance data, respectively.

10. A camera as set forth in claim 9, wherein said memory means further stores image data obtained by photography.

11. A camera as set forth in claim 8, further comprising calculator means for calculating a slope angle of the sloping surface of said ground based on said vertical distance and said minimum distance, and memory means for storing the calculated slope angle as slope-angle data.

12. A camera as set forth in claim 11, wherein said memory means further stores image data obtained by photography.

13. A camera as set forth in claim 11, wherein said memory means further stores said vertical distance as vertical distance data.

14. A camera as set forth in claim 8, wherein said distance-measuring sensor means is rotated from said balanced position to another position for a measurement of said minimum distance.

15. A memory medium storing image data photographed by a camera spaced above a sloping surface of a ground, and distance data exhibiting a vertical distance between said camera and the sloping surface of said ground and a minimum distance between said camera and the sloping surface of said ground.

16. A memory medium storing image data photographed by a camera placed above a sloping surface of a ground, and slope-angle data exhibiting a slope angle of the sloping surface of said ground with respect to a horizontal plane.

17. A memory medium as set forth in claim 16, wherein said memory medium further stores distance data exhibiting a vertical distance between said camera and the sloping surface of said ground.

18. A photogrammetric analytical system, comprising:
   a camera, including an image recording system for recording images of a scene, a distance-measuring sensor unit for detecting a vertical distance to a surface below said camera and a minimum distance to a surface below said camera, and a distance recorder that records at least one vertical distance and minimum distance; and a photogrammetric analytical processor for calculating a survey map of the scene based on the recorded images and on the recorded vertical distance and minimum distance, wherein said distance-measuring sensor unit includes a distance sensor that determines a vertical orientation based on terrestrial gravity to detect the vertical distance.

19. The photogrammetric analytical system according to claim 18,
   wherein said camera includes a conversion device for converting said vertical distance and minimum distance to a slope of said surface, and said distance recorder records a slope of the surface based on the recorded vertical distance and minimum distance.

20. The photogrammetric analytical system according to claim 18,
   wherein said distance sensor is rotatable from said vertical orientation to detect the minimum distance.

21. The photogrammetric analytical system according to claim 18,
   wherein said distance recorder further records sequential vertical distances and minimum distances.

22. The photogrammetric analytical system according to claim 21, wherein said photogrammetric analytical processor calculates a survey map of the scene based on the recorded images and on the recorded sequential vertical distances and minimum distances.

23. The photogrammetric analytical system according to claim 18,
   wherein said distance-measuring sensor unit includes a sensor responsive to terrestrial gravity, and said image recording system records said images including information referencing a coordinate system with respect to terrestrial gravity.

24. The photogrammetric analytical system according to claim 18,
   wherein each vertical distance and minimum distance recorded by said distance recorder corresponds to an image recorded by said image recording system, and each image recorded by said image recording system is recorded with the corresponding vertical distance and minimum distance.

* * * * *